United States Patent
Lu

(10) Patent No.: US 11,035,516 B2
(45) Date of Patent: Jun. 15, 2021

(54) TRIPOD

(71) Applicant: Shenzhen Maxiaolu Technology Co., Ltd, Shenzhen (CN)

(72) Inventor: Wei Lu, Shenzhen (CN)

(73) Assignee: SHENZHEN MAXIAOLU TECHNOLOGY CO., LTD, Shenzhen (CN)

( * ) Notice: Subject to any disclaimer, the term of this patent is extended or adjusted under 35 U.S.C. 154(b) by 36 days.

(21) Appl. No.: 16/568,218

(22) Filed: Sep. 11, 2019

(65) Prior Publication Data
US 2020/0400270 A1  Dec. 24, 2020

(30) Foreign Application Priority Data

Jun. 18, 2019  (CN) .......................... 201910526938.X

(51) Int. Cl.
*F16M 11/00* (2006.01)
*F16M 11/16* (2006.01)
*G03B 17/56* (2021.01)

(52) U.S. Cl.
CPC ............ *F16M 11/16* (2013.01); *G03B 17/561* (2013.01)

(58) Field of Classification Search
CPC ........ F16M 11/00; F16M 11/04; F16M 11/16; F16M 11/242; F16M 11/32
See application file for complete search history.

(56) References Cited

U.S. PATENT DOCUMENTS

| | | | | |
|---|---|---|---|---|
| 7,296,909 B2* | 11/2007 | Van Deursen | .......... | F21S 6/001 362/199 |
| 8,528,868 B2* | 9/2013 | Leung | .................... | F16M 11/18 248/125.8 |
| 9,687,065 B2* | 6/2017 | Hwang | ..................... | A45F 3/44 |
| 9,989,190 B2* | 6/2018 | Torbitt | .................. | F21V 33/008 |
| 2013/0313384 A1* | 11/2013 | Nakatani | .............. | F16M 11/041 248/178.1 |
| 2015/0241762 A1* | 8/2015 | Speggiorin | ............ | F16M 11/06 248/542 |
| 2015/0338017 A1* | 11/2015 | De Faveri | .............. | F16M 11/16 396/428 |
| 2017/0146891 A1* | 5/2017 | Chen | .................... | F16M 11/045 |

* cited by examiner

*Primary Examiner* — Amy J. Sterling

(57) ABSTRACT

Provided is a tripod, comprising a central axis, a mounting table, and a support leg, wherein the central axis runs through and is movably connected to the mounting table, and can slide relative to the mounting table; the support leg is movably connected to the mounting table and can rotate relative to the mounting table to open or be stored; and the central axis is provided thereon with a receiving slot, and when the support leg is being stored, it is rotated to be accommodated in the receiving slot. The support leg of the tripod can be accommodated in the receiving slot when being stored, thereby largely reducing the volume of the tripod and facilitating storage and carrying.

18 Claims, 6 Drawing Sheets

TRIPOD

TECHNICAL FIELD

The present disclosure relates to the field of photographic apparatuses, and in particular to a tripod.

BACKGROUND

An existing tripod with a central axis has the following disadvantages: 1. As the central axis has to run through a mounting table of the tripod, the mounting table is often designed large to ensure sufficient strength, resulting in an increase in the volume of the tripod with a central axis, which is inconvenient to store and carry; 2. A support leg of the tripod will abut against the central axis when being stored and thus will still take up a large room after storage, further resulting in an increase in the volume of the tripod with a central axis, which is inconvenient to store and carry; and 3. A hook arranged on the central axis cannot rotate to satisfy the requirements of suspension for use in different directions.

SUMMARY

In order to solve the above problems, the present disclosure provides a tripod with a special-shaped central axis.

The present disclosure is implemented by the following technical solutions:

The present disclosure provides a tripod, comprising a central axis, a mounting table, and a support leg, wherein the central axis runs through and is movably connected to the mounting table, and can slide relative to the mounting table; the support leg is movably connected to the mounting table, and can rotate relative to the mounting table to open or be stored; and the central axis is provided with a receiving slot, and when the support leg is being stored, it is rotated to be accommodated in the receiving slot.

Further, the mounting table also comprises a fastening ring and is provided thereon with a mounting slot in which the fastening ring is accommodated, the central axis running through the fastening ring which is mounted as a sleeve outside of the central axis.

Further, the mounting table is also provided thereon with a limit hole communicating with the mounting slot, the central axis running in turn through the limit hole and the receiving slot, thereby running through the mounting table, and the limit hole restricting rotation of the central axis.

Further, the mounting table is also provided thereon with a positioning hole communicating with the mounting slot, and comprises a limit column partially accommodated in the positioning hole; the limit column is rotated to extend into the mounting slot, upon which the limit column presses the fastening ring, which thereby clamps and thus locks the central axis.

Further, the mounting table also comprises a mounting column and a screw part, the mounting column being fixedly mounted in the positioning hole, and the limit column running through and being threadedly connected to the mounting column, and being fixedly connected, at an end thereof away from the fastening ring, to the screw part.

Further, the mounting table also comprises a limit plate, which is fixedly mounted to the mounting table and through which the central axis runs.

Further, the central axis also comprises a connecting platform, which is provided at an end thereof with a positioning column accommodated in and fixedly connected to the central axis, the connecting platform also being provided thereon with a bolt and a mounting hole.

Further, the central axis also comprises a hook and a positioning platform partially accommodated in and fixedly connected to the central axis, the hook being movably connected, at an end thereof, to the positioning platform.

Further, the central axis also comprises a positioning block and a connecting column, the positioning block being threadedly connected to the positioning platform and provided thereon with a limit slot, and the connecting column being accommodated in and clamped with the limit slot, and fixedly connected, at an end thereof away from the positioning platform, to the hook.

Further, the support leg also comprises a fastener which extends through the support leg into the mounting table and is fixedly connected to the mounting table.

The beneficial effects of the present disclosure are as follows:

1. The support leg of the tripod provided by the present disclosure can be accommodated in the receiving slot when being stored, thereby largely reducing the volume of the tripod and facilitating its storage and carrying.

2. The central axis of the tripod provided by the present disclosure projects, and the shape of the central axis enables the volume of the mounting table to be reduced, thereby largely reducing the volume of the tripod and facilitating its storage and carrying.

3. The hook of the tripod provided by the present disclosure can rotate freely to satisfy the requirements of suspension for use in different directions.

DETAILED DESCRIPTION

In order to explain the technical solutions of the present disclosure more clearly and completely, the present disclosure will be further described below in conjunction with the accompanying drawings.

Figure 1:
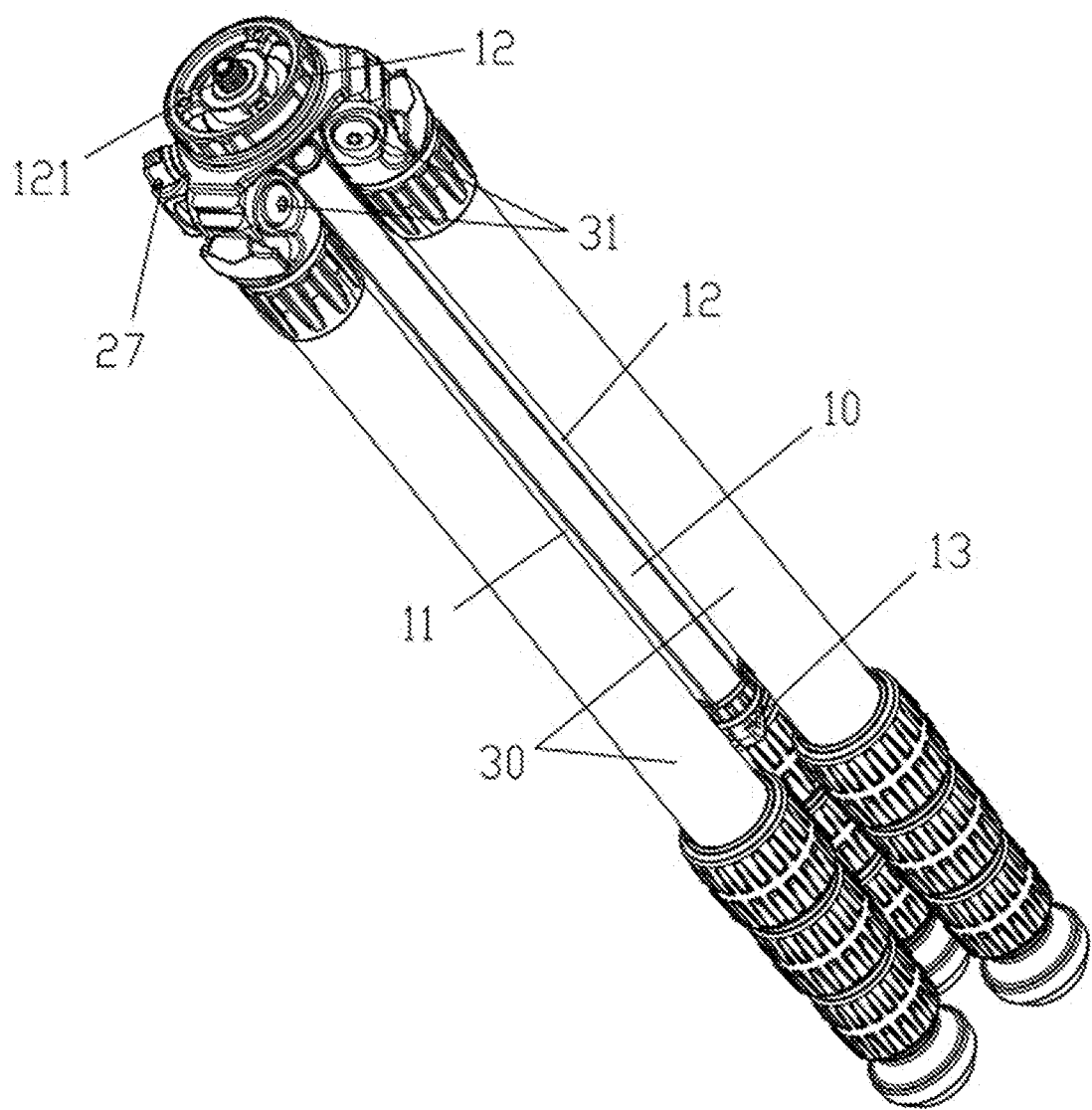
FIG. 1 is a perspective view of a tripod of the present disclosure.
Figure 2:
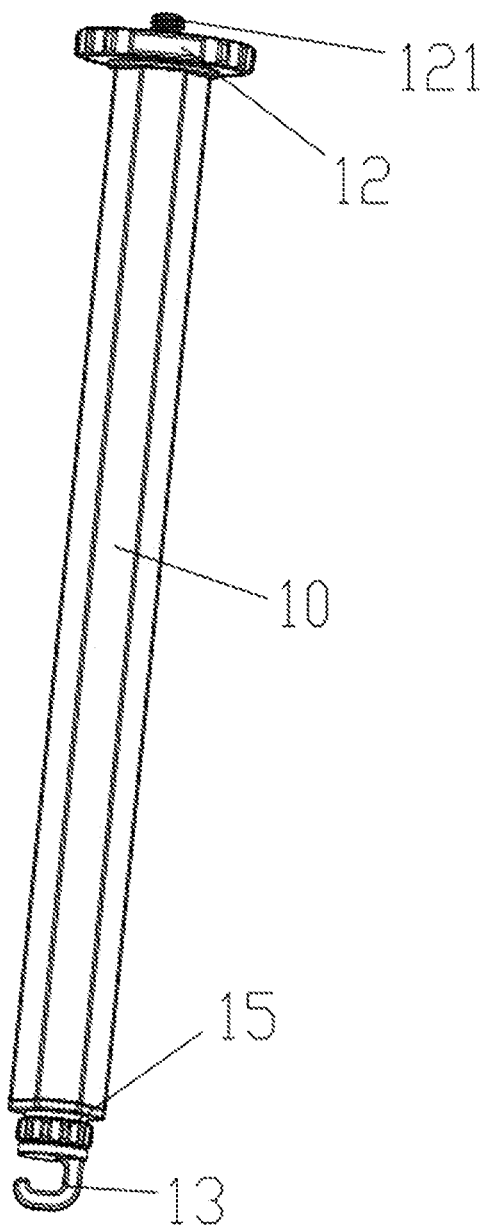
FIG. 2 is a perspective view of a central axis of the tripod of the present disclosure.
Figure 3:
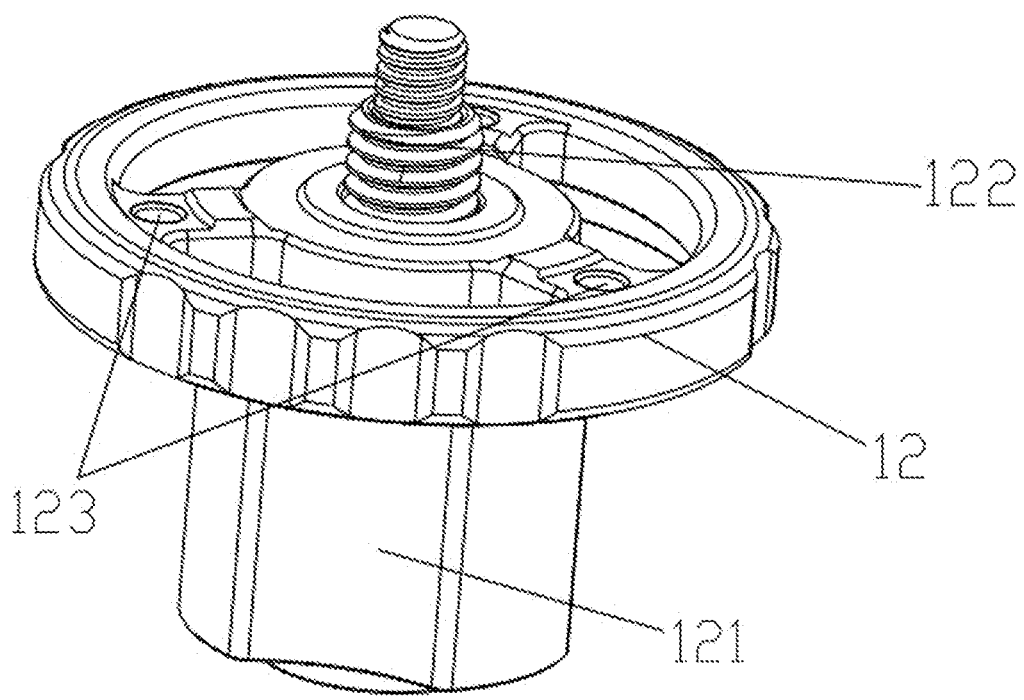
FIG. 3 is a perspective view of a connecting platform of the tripod of the present disclosure.
Figure 4:
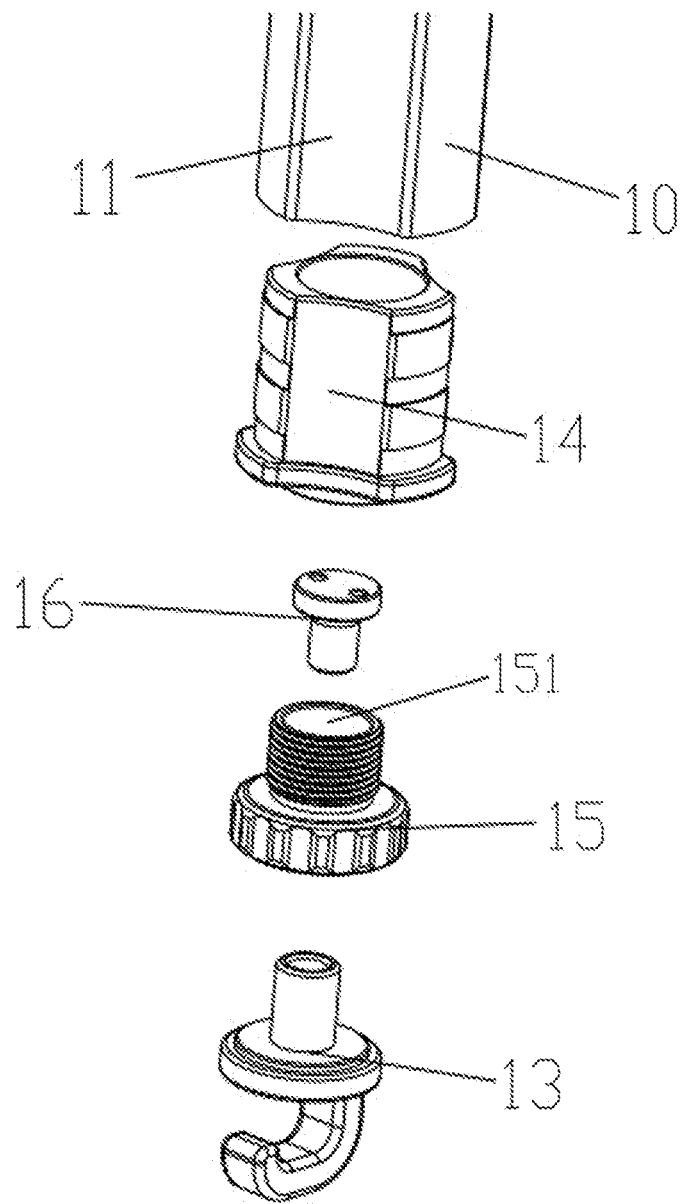
FIG. 4 is a partial exploded view of the central axis of the tripod of the present disclosure.
Figure 5:
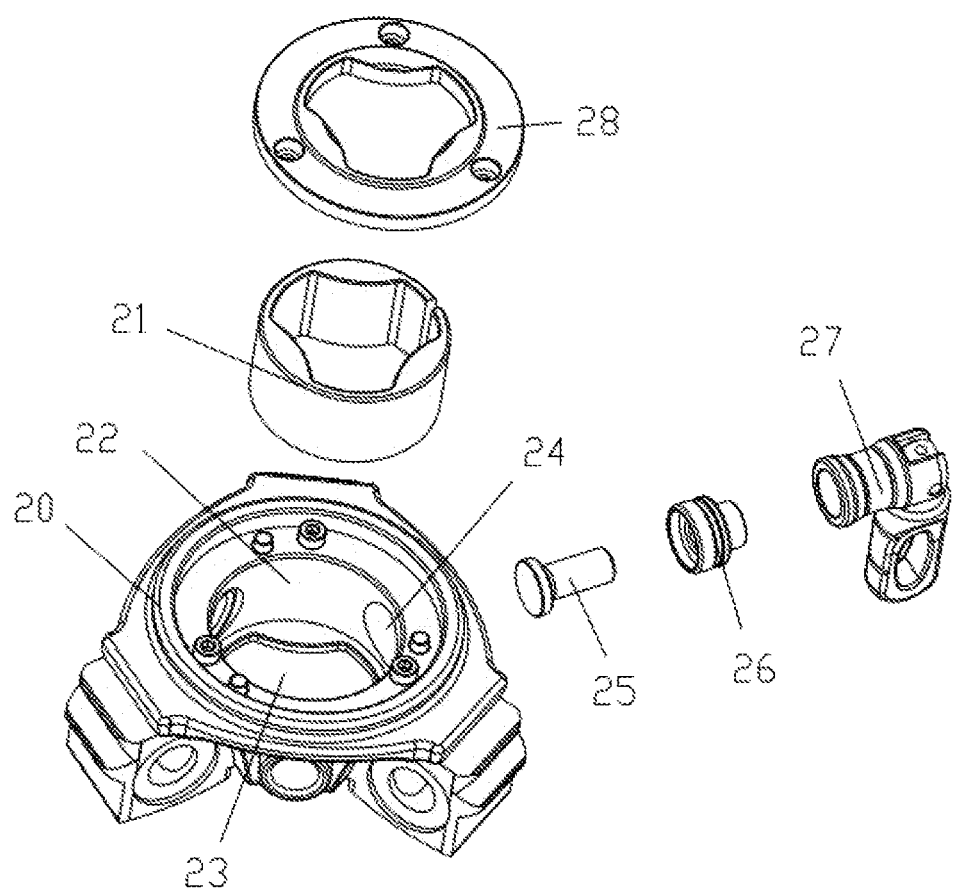
FIG. 5 is an exploded view of a mounting table of the tripod of the present disclosure.
Figure 6:
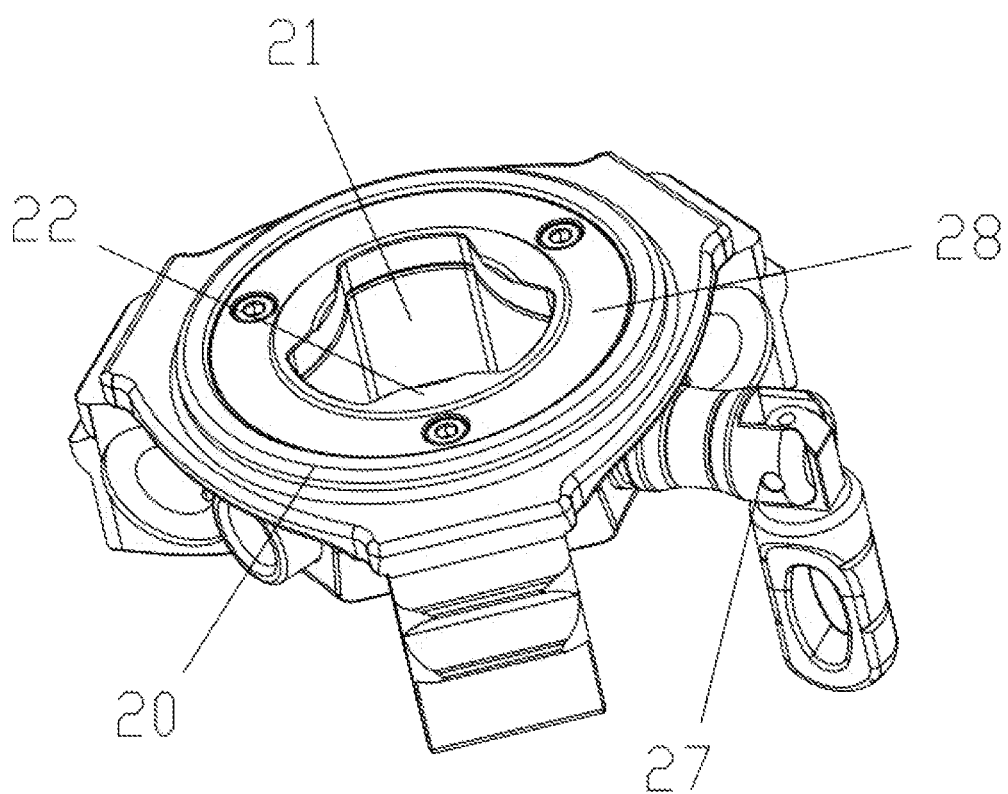
FIG. 6 is a perspective view of the mounting table of the tripod of the present disclosure.

Referring to FIGS. 1 to 6, the present disclosure provides a tripod comprising a central axis 10, a mounting table 20, and a support leg 30. The central axis 10 runs through the mounting table 20 and is movably connected to the mounting table 20. The central axis 10 can slide relative to the mounting table 20. The support leg 30 is movably connected to the mounting table 20, and can rotate relative to the mounting table 20 to open or be stored. The central axis 10 is provided thereon with a receiving slot 11. When the support leg 30 is being stored, it is rotated to be accommodated in the receiving slot 11.

In the present embodiment, the receiving slot 11 runs through the central axis 10, and the number of the receiving slot 11 is the same as that of the support leg 30. The central axis 10 runs through the mounting table 20 and is movably connected to the mounting table 20. The central axis 10 can slide up and down relative to the mounting table 20, and a height of the central axis 10 relative to the mounting table 20 can be adjusted according to the requirements in practical use. When it is necessary to store or carry the tripod, the support leg 30 is rotated to be partially accommodated in the receiving slot 11. As the support leg 30 is partially accommodated in the receiving slot 11, the volume of the tripod is largely reduced. The tripod takes up a smaller space after being stored than an existing tripod does, and is rather convenient to store and carry. The central axis 10 projects in shape, and such a projecting central axis 10 runs through the mounting table 20. The central axis 10 takes up a smaller space in the mounting table 20, further reducing the volume of the mounting table 20. As a result, the tripod has a reduced volume and is rather convenient to store and carry.

Further, the mounting table 20 also comprises a fastening ring 21, and is provided thereon with a mounting slot 22. The fastening ring 21 is accommodated in the mounting slot 22, and the central axis 10 runs through the fastening ring 21 mounted as a sleeve outside of the central axis 10.

In the present embodiment, the fastening ring 21 is accommodated in the mounting slot 22, and occupies the mounting slot 22 completely such that the central axis 10 does not sway when sliding up and down relative to the mounting table 20.

Further, the mounting table 20 is also provided thereon with a limit hole 23 communicating with the mounting slot 22. The central axis 10 runs through the limit hole 23 and the receiving slot 11 in turn, thereby running through the mounting table 20. The limit hole 23 restricts the rotation of the central axis 10.

In the present embodiment, the shape of the limit hole 23 is consistent with that of the central axis 10, which runs through the limit hole 23 and the receiving slot 11 in turn, thereby running through the mounting table 20. The limit hole 23 restricts the rotation of the central axis 10.

Further, the mounting table 20 is also provided thereon with a positioning hole 24 communicating with the mounting slot 22. The mounting table 20 further comprises a limit column 25 partially accommodated in the positioning hole 24. The limit column 25 is rotated to extend into the mounting slot 22, upon which the limit column 25 presses the fastening ring 21 which thereby clamps and thus locks the central axis 10.

In the present embodiment, when it is necessary to adjust a position (height) of the central axis 10 relative to the mounting table 20, the limit column 25 is rotated to be accommodated within the positioning hole 24. At this moment, the limit column 25 does not express the fastening ring 21, and the central axis 10 can slide up and down relative to the mounting table 20. After the central axis 10 slides to a preset position, the limit column 25 is rotated in an opposite direction to extend into the mounting slot 22. At this moment, the limit column 25 presses the fastening ring 21 which thereby clamps and thus locks the central axis 10. After being locked, the central axis 10 cannot slide up and down relative to the mounting table 20.

Further, the mounting table 20 also comprises a mounting column 26 and a screw part 27. The mounting column 26 is fixedly mounted in the positioning hole 24. The limit column 25 runs through and is threadedly connected to the mounting column 26. The limit column 25 is fixedly connected, at an end thereof away from the fastening ring 21, to the screw part 27.

In the present embodiment, the limit column 25 runs through the mounting column 26 and is threadedly connected to the mounting column 26. The threaded connection enables the limit column 25 to have a better damping sense in rotation. The screw part 27 can be just turned to drive the limit column 25 to rotate, which is rather convenient to use.

Further, the mounting table 20 also comprises a limit plate 28, which is fixedly mounted to the mounting table 20 and through which the central axis 10 runs.

In the present embodiment, the limit plate 28 is fixedly connected to the mounting table 20 through a bolt. The central axis 10 runs through the limit plate 28, which restricts rotation of the central axis 10 relative to the mounting table 20 and prevents the central axis 10 from swaying when sliding up and down with respect to the mounting table 20.

Further, the central axis 10 also comprises a connecting platform 12, which is provided, at an end thereof, with a positioning column 121 accommodated in and fixedly connected to the central axis 10. The connecting platform 12 is further provided thereon with a bolt 122 and a mounting hole 123.

In the present embodiment, the positioning column 121 is fixedly connected to the connecting platform 12. The bolt 122 is fixedly connected to the connecting platform 12, and used, along with the mounting hole 123, for mounting external apparatuses, such as a platform, a camera, and the like.

Further, the central axis 10 also comprises a hook 13 and a positioning platform 14. The positioning platform 14 is partially accommodated within and fixedly connected to the central axis 10, and the hook 13 is movably connected, at an end thereof, to the positioning platform 14.

In the present embodiment, the hook 131 is movably connected, at an end thereof, to the positioning platform 14, and can rotate freely relative to the positioning platform 14. The hook 13 can satisfy the requirements of suspension for use in different directions.

Further, the central axis 10 also comprises a positioning block 13 and a connecting column 16. The positioning block 15 is threadedly connected to the positioning platform 14, and is provided thereon with a limit slot 151. The connecting column 16 is accommodated in and clamped with the limit slot 151. The connecting column 16 is fixedly connected, at an end thereof away from the positioning platform 14, to the hook 13.

In the present embodiment, when the positioning block 15 is threadedly connected to the positioning platform 14, the positioning platform 14 shields the limit slot 151. The connecting column 16 is accommodated in and clamped with the limit slot 151. The connecting column 16 can rotate freely within the limit slot 151, and is fixedly connected, at an end thereof away from the positioning platform 14, to the hook 13, which can thereby rotate freely relative to the positioning platform 14. At this moment, the hook 13 is partially accommodated in the limit slot 151, and can satisfy the requirements of suspension for use in different directions.

Further, the support leg 30 also comprises a fastener 31, which runs through the support leg 30 to extend into the mounting table 20 and is fixedly connected to the mounting table 20.

In the present embodiment, the fastener 31 and the support leg 30 are movably connected such that the support leg 30 and the mounting table 20 form a movable connection to each other, the support leg 30 capable of rotating relative to the mounting table 20 to open or be stored.

The present disclosure may certainly also have various other embodiments. Other embodiments obtained by those of ordinary skill in the art based on the present embodiment without incurring any creative labor fall within the scope of protection of the present disclosure.

What is claimed is:

1. A tripod, comprising a central axis, a mounting table, and a support leg, wherein the central axis runs through and is movably connected to the mounting table; the support leg is movably connected to the mounting table, and can rotate relative to the mounting table; and the central axis is provided thereon with a receiving slot, and when the support leg is being stored, it is rotated to be accommodated in the receiving slot; and wherein the mounting table further comprises a limit plate, which is fixedly mounted to the mounting table and through which the central axis runs.

2. The tripod according to claim 1, wherein the mounting table further comprises a fastening ring and is provided thereon with a mounting slot in which the fastening ring is accommodated, the central axis running through the fastening ring which is mounted as a sleeve outside of the central axis.

3. The tripod according to claim 2, wherein the mounting table is further provided thereon with a limit hole communicating with the mounting slot, the central axis running in turn through the limit hole and the receiving slot, thereby running through the mounting table, and the limit hole restricting rotation of the central axis.

4. The tripod according to claim 2, wherein the mounting table is further provided thereon with a positioning hole communicating with the mounting slot, and comprises a limit column partially accommodated in the positioning hole.

5. The tripod according to claim 4, wherein the mounting table further comprises a mounting column and a screw part, the mounting column being fixedly mounted in the positioning hole, and the limit column running through and being threadedly connected to the mounting column, and being fixedly connected, at an end thereof away from the fastening ring, to the screw part.

6. The tripod according to claim 1, wherein the central axis further comprises a connecting platform, which is provided at an end thereof with a positioning column accommodated in and fixedly connected to the central axis, the connecting platform further being provided with a bolt and a mounting hole.

7. The tripod according to claim 1, wherein the central axis further comprises a hook and a positioning platform partially accommodated in and fixedly connected to the central axis, the hook being movably connected, at an end thereof, to the positioning platform.

8. The tripod according to claim 7, wherein the central axis further comprises a positioning block and a connecting column, the positioning block being threadedly connected to the positioning platform and provided thereon with a limit slot, and the connecting column being accommodated in and clamped with the limit slot and fixedly connected, at an end thereof away from the positioning platform, to the hook.

9. The tripod according to claim 1, wherein the support leg further comprises a fastener which runs through the support leg to extend into the mounting table and is fixedly connected to the mounting table.

10. A tripod, comprising a central axis, a mounting table, and a support leg, wherein the central axis runs through and is movably connected to the mounting table; the support leg is movably connected to the mounting table, and can rotate relative to the mounting table; and the central axis is provided thereon with a receiving slot, and when the support leg is being stored, it is rotated to be accommodated in the receiving slot; wherein the support leg further comprises a fastener which runs through the support leg to extend into the mounting table and is fixedly connected to the mounting table.

11. The tripod according to claim 10, wherein the mounting table further comprises a fastening ring and is provided thereon with a mounting slot in which the fastening ring is accommodated, the central axis running through the fastening ring which is mounted as a sleeve outside of the central axis.

12. The tripod according to claim 11, wherein the mounting table is further provided thereon with a limit hole communicating with the mounting slot, the central axis running in turn through the limit hole and the receiving slot, thereby running through the mounting table, and the limit hole restricting rotation of the central axis.

13. The tripod according to claim 11, wherein the mounting table is further provided thereon with a positioning hole communicating with the mounting slot, and comprises a limit column partially accommodated in the positioning hole.

14. The tripod according to claim 13, wherein the mounting table further comprises a mounting column and a screw part, the mounting column being fixedly mounted in the positioning hole, and the limit column running through and being threadedly connected to the mounting column, and being fixedly connected, at an end thereof away from the fastening ring, to the screw part.

15. The tripod according to claim 10, wherein the central axis further comprises a connecting platform, which is provided at an end thereof with a positioning column accommodated in and fixedly connected to the central axis, the connecting platform further being provided with a bolt and a mounting hole.

16. The tripod according to claim 10, wherein the central axis further comprises a hook and a positioning platform partially accommodated in and fixedly connected to the central axis, the hook being movably connected, at an end thereof, to the positioning platform.

17. The tripod according to claim 16, wherein the central axis further comprises a positioning block and a connecting column, the positioning block being threadedly connected to the positioning platform and provided thereon with a limit slot, and the connecting column being accommodated in and clamped with the limit slot and fixedly connected, at an end thereof away from the positioning platform, to the hook.

18. A tripod, comprising a central axis, a mounting table, and a support leg, wherein the central axis runs through and is movably connected to the mounting table, the support leg is rotatably connected to the mounting table; the central axis is provided thereon with a receiving slot for accommodating the support leg; the tripod further comprises a connecting platform disposed above the mounting table, the central axis has an end extending through the mounting table to connect with the connecting platform, and the central axis is longitudinally movable relative to the mounting table in such a way that a heigh of the connecting platform relative to the mounting table is adjustable.

* * * * *